US009290981B2

(12) United States Patent
Weingaertner et al.

(10) Patent No.: US 9,290,981 B2
(45) Date of Patent: Mar. 22, 2016

(54) DRIVE ARRANGEMENT OF THE MOTORIZED ADJUSTMENT OF A CLOSURE ELEMENT OF A MOTOR VEHICLE

(71) Applicant: Brose Fahrzeugteile GmbH & Co. KG, Hallstadt, Hallstadt (DE)

(72) Inventors: Thomas Weingaertner, Memmelsdorf (DE); Carsten Abert, Hassfurt (DE); Marcus Klopp, Coburg (DE); Robert Neundorf, Ebersdorf (DE); Holger Wuerstlein, Zeil am Main (DE); Christian Herrmann, Coburg (DE); Thorsten Kuhnen, Litzendorf (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 0 days.

(21) Appl. No.: 14/133,211

(22) Filed: Dec. 18, 2013

(65) Prior Publication Data

US 2014/0165469 A1 Jun. 19, 2014

(30) Foreign Application Priority Data

Dec. 18, 2012 (DE) ........................ 10 2012 024 690

(51) Int. Cl.
*B62D 25/00* (2006.01)
*E05F 15/622* (2015.01)

(52) U.S. Cl.
CPC ......... *E05F 15/622* (2015.01); *E05Y 2400/812* (2013.01); *E05Y 2900/50* (2013.01); *E05Y 2900/546* (2013.01)

(58) Field of Classification Search
CPC .................................................... E05Y 15/622
USPC ............ 49/339, 340, 343, 26, 13, 14; 296/56
See application file for complete search history.

(56) References Cited

U.S. PATENT DOCUMENTS

| | | | | |
|---|---|---|---|---|
| 6,172,430 | B1 * | 1/2001 | Schmitz et al. | 307/10.2 |
| 7,665,794 | B2 * | 2/2010 | Kachouh | 296/146.3 |
| 8,061,478 | B2 * | 11/2011 | Drouin | 181/294 |
| 8,244,457 | B2 * | 8/2012 | Milark et al. | 701/301 |
| 2004/0124708 | A1 * | 7/2004 | Giehler et al. | 307/10.5 |
| 2008/0033647 | A1 * | 2/2008 | Milark et al. | 701/300 |
| 2009/0277717 | A1 * | 11/2009 | Drouin | 181/294 |
| 2010/0179725 | A1 * | 7/2010 | Boote et al. | 701/36 |

(Continued)

FOREIGN PATENT DOCUMENTS

| | | |
|---|---|---|
| DE | 19939651 | 6/2001 |
| DE | 202006006478 | 8/2007 |

(Continued)

OTHER PUBLICATIONS

"German Search Report," for DE Application No. 10 2012 024 690.0, mailed Jan. 14, 2013 (5 pages).

*Primary Examiner* — Jerry Redman
(74) *Attorney, Agent, or Firm* — Pauly, Devries Smith & Deffner, LLC

(57) ABSTRACT

The invention relates to a drive arrangement for the motorized adjustment of a closure element of a motor vehicle, wherein the drive arrangement, in the installed state, is coupled in drive terms to the closure element. It is proposed for the drive arrangement to have at least one drive, which is intended for generating drive movements and in or on which is arranged an acoustic indicator for supplying acoustic feedback to the user.

20 Claims, 4 Drawing Sheets

(56) References Cited

U.S. PATENT DOCUMENTS

| | | | | |
|---|---|---|---|---|
| 2011/0041406 | A1* | 2/2011 | Jimenez Del Amo et al. | 49/13 |
| 2011/0260848 | A1* | 10/2011 | Rodriguez Barros et al. | 340/438 |
| 2014/0095038 | A1* | 4/2014 | Breu et al. | 701/67 |
| 2014/0117777 | A1* | 5/2014 | Rees et al. | 307/115 |

FOREIGN PATENT DOCUMENTS

| | | | |
|---|---|---|---|
| DE | 102008050885 | A1 * | 4/2010 |
| DE | 102008062391 | | 6/2010 |

* cited by examiner

DRIVE ARRANGEMENT OF THE MOTORIZED ADJUSTMENT OF A CLOSURE ELEMENT OF A MOTOR VEHICLE

CROSS-REFERENCE TO RELATED APPLICATIONS

This application is a national stage application under 35 U.S.C. 371 of German Patent Application Serial No. 10 2012 024 690.0, entitled "Antriebsanordnung für die motorische Verstellung eines Verschlusselements eines Kraftfahrzeugs," filed Dec. 18, 2012, the disclosure of which is hereby incorporated by reference herein in their entirety.

FIELD OF THE INVENTION

The present invention relates to a drive arrangement for the motorized adjustment of a closure element of a motor vehicle and to a closure-element arrangement of a motor vehicle, having a drive arrangement.

BACKGROUND

The expression "closure element" should be understood in broad terms here. It covers, for example, a tailgate, a boot lid, a bonnet, a side door, a cargo-space hatch closure, a window, a pop top or the like of a motor vehicle. The application area of the motorized adjustment of a tailgate of a motor vehicle will be referred to predominantly herein below. This should not be understood in a limiting sense.

The motorized adjustment of a tailgate or the like has become common practice in recent years in particular in the area of combi vehicles. In addition to reliable and quiet motorized adjustment, the convenient and reliable operation has a quite particular role to play here. Since there is barely enough installation space for accommodating indicators in the region of a tailgate or the like, it is a particular challenge to supply the user with feedback relating to drive-relevant information or the like.

A known drive arrangement (DE 10 2008 062 391 A1) is equipped with two drives each configured as a spindle drive. With the tailgate closed, the spindle drives are arranged in the respective drip moulding of the motor vehicle. Any kind of feedback to the user is not provided for here.

The known drive arrangement (DE 199 39 651 A1) from which the invention proceeds serves for the motorized adjustment of a closure element such as a tailgate of the motor vehicle. Provision is made here for acoustic status signals to be fed back to the user. For this purpose, a corresponding acoustic indicator is provided on the tailgate itself, on the motor-vehicle key or on a radio remote control device. Depending on the specific use, the cabling of these acoustic indicators may involve high outlay. It is often also the case that the acoustic feedback is not sufficiently perceptible to the user. This is the case, for example, when the acoustic feedback is emitted via a remote control device, which may possibly be located in the user's pocket.

The invention is based on the problem of optimizing the known drive arrangement in respect of optimum acoustic feedback to the user.

SUMMARY

The above problem is solved, in the case of a drive arrangement according to the following.

The essential factor is the basic consideration that an acoustic indicator for supplying acoustic feedback to the user may be configured as a constituent part of the drive arrangement. In specific terms, the proposed drive arrangement is configured with at least one drive, which is intended for generating drive movements and in or on which is arranged an acoustic indicator for supplying acoustic feedback to the user.

In accordance with the proposal, it has been found, in the first instance, that the drive of the drive arrangement is arranged basically in the vicinity of the user to whom the acoustic feedback is to be emitted. It has also been found that a straightforward electrical connection of the acoustic indicator is possible in or on the drive, without there being any need for cables to be laid in addition. Finally, it has been found that, for a good many operations of supplying feedback to the user, all the relevant information and signals are already present in the drive. This may be, for example, the feedback that an end stop, which is interrogated via a limit switch present in the drive, has been reached.

The proposed solution thus makes it possible to realize clearly perceptible acoustic feedback with a low level of outlay.

Numerous advantageous variants are conceivable for the kind of information which can be fed back by the acoustic indicator. For example, it is possible to supply feedback in respect of a situation where something gets caught, a situation where the closure element reaches a predetermined position or the occurrence of a predetermined fault situation. It is also conceivable, however, for information which has nothing to do with the drive arrangement to be fed back acoustically. It would be conceivable, for example, to supply acoustic feedback in respect of an accidentally switched-on lighting device or the like.

In an embodiment, feedback is supplied by the acoustic indicator in respect of the running of the motorized adjustment of the closure element. This means that an acoustic warning signal is emitted during at least part of the motorized-adjustment operation, such as during the entire motorized-adjustment operation, of the closure element. This ensures that the user is provided with acoustic warning during the motorized adjustment of the closure element, this operation always involving a certain risk of injury for the user.

Some embodiments can relate to variants for the arrangement in or on the respective drive.

In an embodiment, the acoustic indicator can be operated electrically, and this therefore can allow flexible controllability of the acoustic indicator.

It is also conceivable, however, for the acoustic signals of the acoustic indicator to be generated by a relative movement of components of the drive during the motorized adjustment of the drive. For example, use can be made here of ratchet concepts or whistling concepts.

An embodiment can include a closure-element arrangement of a motor vehicle, having a closure element as indicated above and a drive arrangement as indicated above.

The essential factor, according to the further teaching, is that, in the installed state, the drive arrangement is exposed at least in part in relation to the motor-vehicle environment at least over an adjusting region of the closure element. It is thus possible, in principle, for the acoustic indicator to be arranged in an exposed state such that the acoustic feedback is clearly perceptible to the user.

In an embodiment, with the closure element closed, the drive arrangement is covered by the closure element, and therefore the drive arrangement is not in any way visually obtrusive.

In an embodiment, the invention provides a drive arrangement for the motorized adjustment of a closure element of a motor vehicle, wherein the drive arrangement, in the installed state, is coupled in drive terms to the closure element, wherein the drive arrangement has at least one drive, which is intended for generating drive movements and in or on which is arranged an acoustic indicator for supplying acoustic feedback to the user.

In an embodiment, the acoustic feedback covers the running of the motorized adjustment of the closure element, a situation where something gets caught, a situation where the closure element reaches a predetermined position, the occurrence of a predetermined fault situation or the like, such as triggering the acoustic indication via the acoustic indicator, an electrical indication-control means is provided, such as at least part of the indication-control means is integrated in the acoustic indicator, such as a predetermined status is detected self-sufficiently, and output acoustically, by means of the indication-control means integrated in the acoustic indicator.

In an embodiment, the drive is configured as an elongate linear drive which, at each end, has a mechanical connection for delivering the drive moments, which is configured in particular as part of a ball-and-socket joint, such as the acoustic indicator is arranged in the region of at least one of the mechanical connections, such as in one of the connections.

In an embodiment, the drive has a drive housing, and in that the acoustic indicator is arranged in or on the drive housing, such as the drive housing has two sub-housings which run telescopically one inside the other during the motorized adjustment.

In an embodiment, the drive is configured as a spindle drive and has a drive motor and a spindle/spindle-nut gear mechanism, which is arranged downstream of the drive motor, such as the drive shaft of the drive motor and the spindle of the spindle/spindle-nut gear mechanism are arranged coaxially in relation to one another, such as the drive has a drive module, which has the drive motor and possibly an intermediate gear mechanism, in particular a reduction-gear mechanism, arranged between the drive motor and the spindle/spindle-nut gear mechanism, and in that the acoustic indicator is arranged in or on the drive module, such as the drive module has a drive-module housing.

In an embodiment, the drive housing has a bush-like termination piece at least at one end, and in that the acoustic indicator is arranged, at least in part, within the bush-like termination piece.

In an embodiment, the acoustic indicator has a dedicated housing, and in that the housing of the acoustic indicator is positioned on the drive.

In an embodiment, the drive housing or the drive-module housing is configured, and the acoustic indicator is arranged, such that the drive housing or the drive-module housing serves as a resonating body for the acoustic indicator.

In an embodiment, the drive has an electrical connection arrangement, and in that the acoustic indicator is arranged within the electrical connection arrangement, such that the electrical connection arrangement has a cable-like supply line, and in that the acoustic indicator is arranged in or on the cable-like supply line.

In an embodiment, the electrical connection arrangement comprises a plug arrangement and the acoustic indicator is arranged in or on the plug arrangement, such as the plug arrangement comprises an intermediate plug, in or on which the acoustic indicator is arranged.

In an embodiment, the acoustic signals of the acoustic indicator are generated by an electric acoustic generator, such as the acoustic indicator comprises an electric loudspeaker, an electric buzzer or the like.

In an embodiment, the acoustic signals of the acoustic indicator are generated by a relative movement of components of the drive during the motorized adjustment of the drive.

In an embodiment, a closure-element arrangement of a motor vehicle, having a closure element and a drive arrangement as described above for the motorized adjustment of the closure element, wherein, in the installed state, the drive arrangement, in particular the acoustic indicator, is exposed at least in part in relation to the motor-vehicle environment at least over an adjusting region of the closure element.

In an embodiment, the closure element closed, the drive arrangement is covered by the closure element, such as located in a drip moulding, such as the drive is configured as a spindle drive and has a drive motor and a spindle/spindle-nut gear mechanism, which is arranged downstream of the drive motor, and in that, with the closure element closed, the spindle drive is aligned with the drip moulding.

In an embodiment, the closure element is a tailgate, a boot lid, a bonnet, a side door, a cargo-space hatch closure, a window, a pop top or the like of a motor vehicle.

BRIEF DESCRIPTION OF THE FIGURES

The invention will be explained in more detail herein below with reference to a drawing, which constitutes merely an exemplary embodiment and in which.

DETAILED DESCRIPTION

Figure 1:
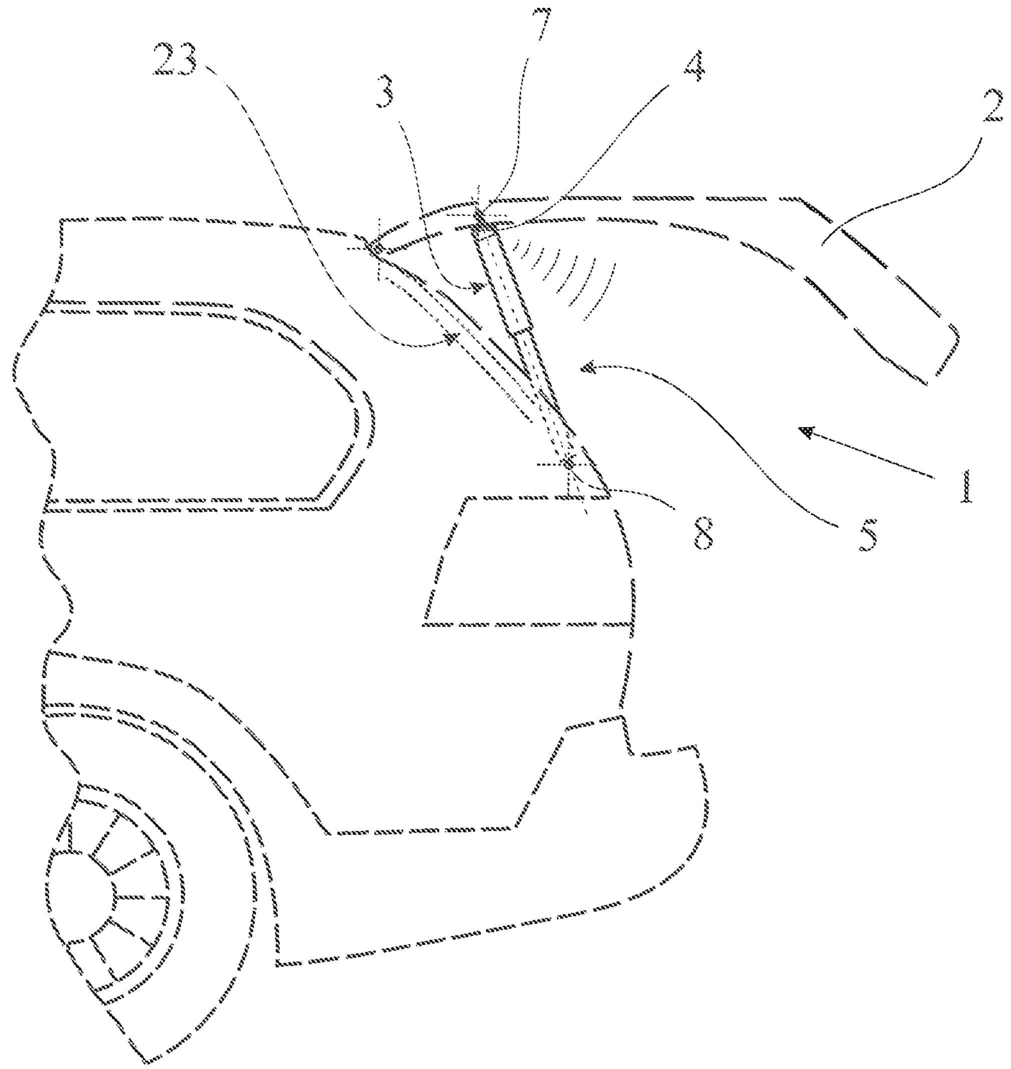
FIG. 1 shows a schematic side view of the rear of a motor vehicle with a proposed drive arrangement.

The drive arrangement 1 illustrated in the drawing serves for the motorized adjustment of a closure element 2 of a motor vehicle. The closure element 2 here is a tailgate of a motor vehicle.

The drive arrangement 1, in the installed state, which is illustrated in FIG. 1, is coupled in drive terms to the closure element 2. The drive arrangement 1 usually performs the function of adjusting the closure element 2, in this case the tailgate 2, between the open position, which is illustrated in FIG. 1, and a closed position (not illustrated). Depending on the specific use, it is additionally possible to provide a spring arrangement to push the closure element 2 into the open position, and therefore the drive arrangement 1 acts counter to the force of the spring arrangement at least over an adjusting region of the closure element 2. In the case of the exemplary embodiments illustrated, such a spring arrangement 1*a* is integrated in the drive arrangement 1.

Figure 2:
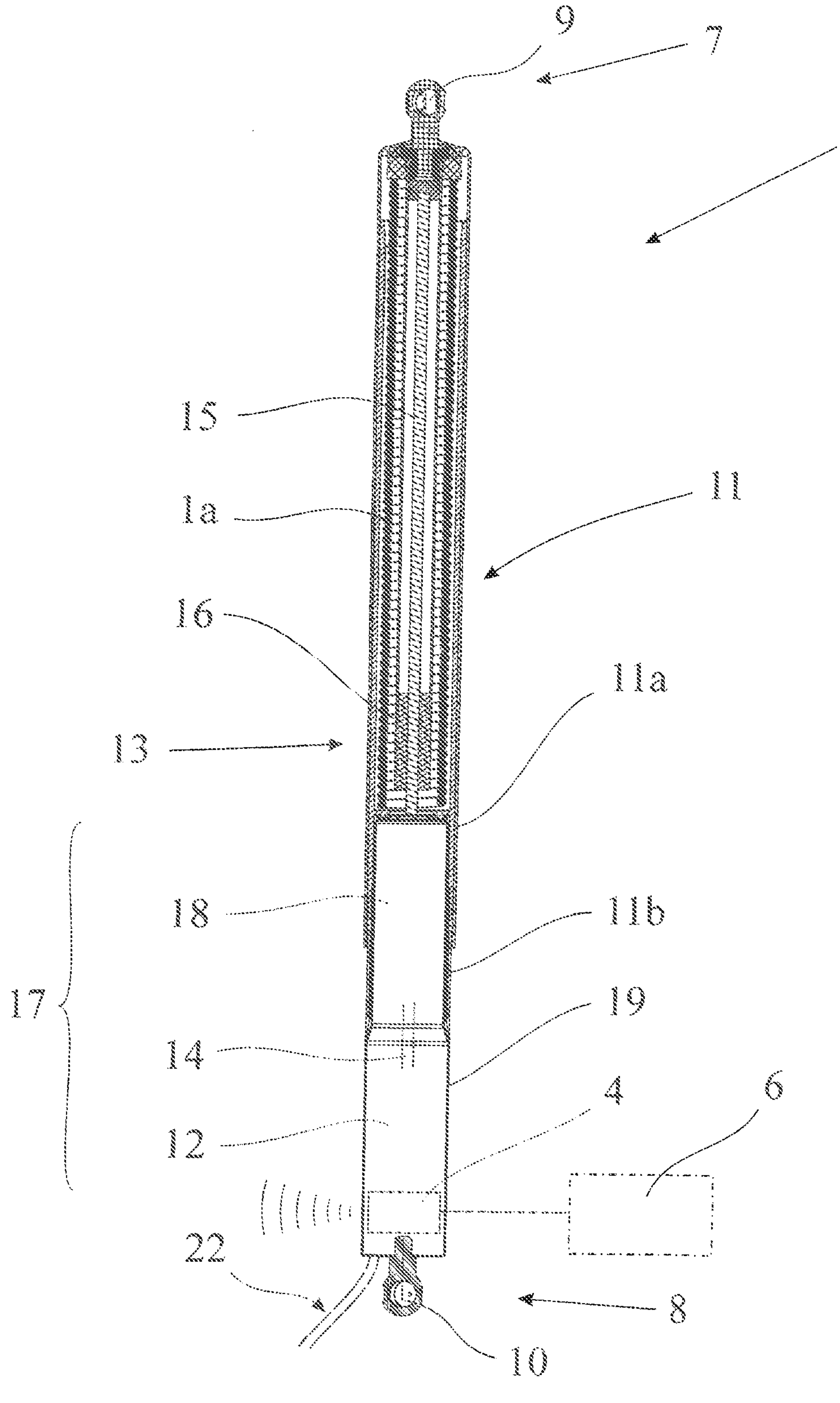
FIG. 2 shows a side view, partly in section, of a drive of the drive arrangement according to FIG. 1 in the uninstalled state.

The essential factor, then, is for the drive arrangement 1 to have at least one drive 3, which is intended for generating drive movements and in (FIGS. 2 and 3) or on (FIG. 4) which is arranged an acoustic indicator 4 for supplying acoustic feedback to the user. It is thus possible for acoustic status messages to be emitted to the user directly via the drive 3.

In the case of the exemplary embodiment which is illustrated in FIG. 1, a total of two drives 3 are provided, these being arranged on two opposite peripheral regions of a tailgate opening 5. It is the case here, that the two drives 3 are each equipped with an acoustic indicator 4. It is also conceivable, however, for just one of the two drives 3 to be equipped with a corresponding acoustic indicator 4.

To keep the description simple, the following text will refer to just one drive 3. All that is said in respect of this one drive 3 applies correspondingly to a drive arrangement 1 having a plurality of, in particular having two, drives 3.

The proposed acoustic indicator 4 can be used for different acoustic feedback operations. The acoustic feedback can cover a situation where something gets caught, a situation where the closure element 2 reaches a predetermined position, in particular an end position, or the occurrence of a predetermined fault situation or the like. In an embodiment, for triggering the acoustic indication via the acoustic indicator 4, an electrical indication-control means 6 is provided, this being illustrated, by way of example, in FIG. 2. The electrical indication-control means 6 may be integrated in a closure-element controller assigned to the closure element 2. It is also conceivable, however, for the electrical indication-control means 6 to be integrated in a central motor-vehicle control means.

Particularly reliable motorized adjustment of the closure element 2 can be achieved in that the acoustic feedback covers the running of the motorized adjustment of the closure element 2. This is the case in particular when the acoustic feedback is emitted during the entire motorized-adjustment operation of the closure element 2.

In an embodiment, at least part of the indication-control means 6 is integrated in the acoustic indicator 4. This decentralized structure of the indication-control means 6 can be realized with minimal cabling outlay. In the case of the decentralized control-means structure, it is conceivable, for example, for a predetermined status to be detected self-sufficiently, and output acoustically, by means of the indication-control means 6 integrated in the acoustic indictor 4. "Self-sufficiently" here means that the indication-control means 6 performs the function of triggering the acoustic indicator 4, without itself having to be triggered by a higher-order control means. For example, the indication-control means 6 then monitors a limit switch arranged in the drive 3 and, when the limit switch is switched, gives a corresponding triggering signal to the acoustic indicator 4.

Numerous advantageous variants are conceivable for the design of the drive 3. It is the case here, that the drive 3 is configured as an elongate linear drive which, at each end, has a mechanical connection 7, 8 for delivering the drive movements. In the case of the exemplary embodiments which are illustrated, the connections 7, 8 each constitute a ball socket 9, 10 and thus, in the installed state, each provide part of a ball-and-socket joint. As far as the basic design of such a spindle drive is concerned, reference may be made to DE 10 2008 062 391 A1, which belongs to the applicant and, to this extent, forms the subject matter of the present application.

In an embodiment, the acoustic indicator 4 is arranged in the region of at least one of the mechanical connections 7, 8. This is the case, for example, in the configuration shown in FIG. 3. It is also conceivable, however, for the acoustic indicator 4 to be arranged in one of the connections 7, 8 themselves. This would result in a quite particularly compact configuration.

In the case of all the exemplary embodiments illustrated, the drive 3 has a drive housing 11, wherein the acoustic indicator 4 is arranged in (FIGS. 2 and 3) or on (FIG. 4) the drive housing 11. The drive housing 11 has two sub-housings 11*a*, 11*b* which run telescopically one inside the other during the motorized adjustment. Here too, reference may be made to the aforementioned DE 10 2008 062 391 A1.

In an embodiment, the drive 3 is an electromotive drive. It is also conceivable, however, for it to be a hydraulic or pneumatic drive or the like.

A particularly compact configuration is achieved by the drive 3 being configured here as a spindle drive and having a drive motor 12 and a spindle/spindle-nut gear mechanism 13, which is arranged downstream of the drive motor 12, wherein the drive shaft 14 of the drive motor 12 and the spindle 15, which is in engagement with a spindle nut 16, are arranged coaxially in relation to one another. A narrow and elongate configuration can be achieved by way of this coaxial, and thus also sequential, arrangement of the drive motor 12 and spindle 15.

The construction of the spindle drive 3 is of particular importance here. The drive 3 here is equipped with a drive module 17, which has the drive motor 12 and possibly an intermediate gear mechanism 18 arranged between the drive motor 12 and the spindle/spindle-nut gear mechanism 13. The intermediate gear mechanism 18 can include a reduction-gear mechanism. The acoustic indicator 4 can be arranged in (FIG. 2) or on (FIG. 4) the drive module.

The above configuration of the drive 3 with a drive module 17 is particularly advantageous if, as in this case, the drive module 17 has a drive-module housing 19. It is thus a simple matter to handle, and in particular to install, the drive module 17, including the acoustic indicator 4.

It is possible, in principle, for the entire acoustic indicator 4 to be arranged within the drive housing 11 or the drive-module housing 19. It is also conceivable, however, for the acoustic indicator 4 to constitute part of the drive housing 11 or of the drive-module housing 19. It is thus possible to ensure, in a particularly straightforward manner, that the sound waves generated by the acoustic indicator 4 can pass outwards without having to pass through a housing wall.

Figure 3:
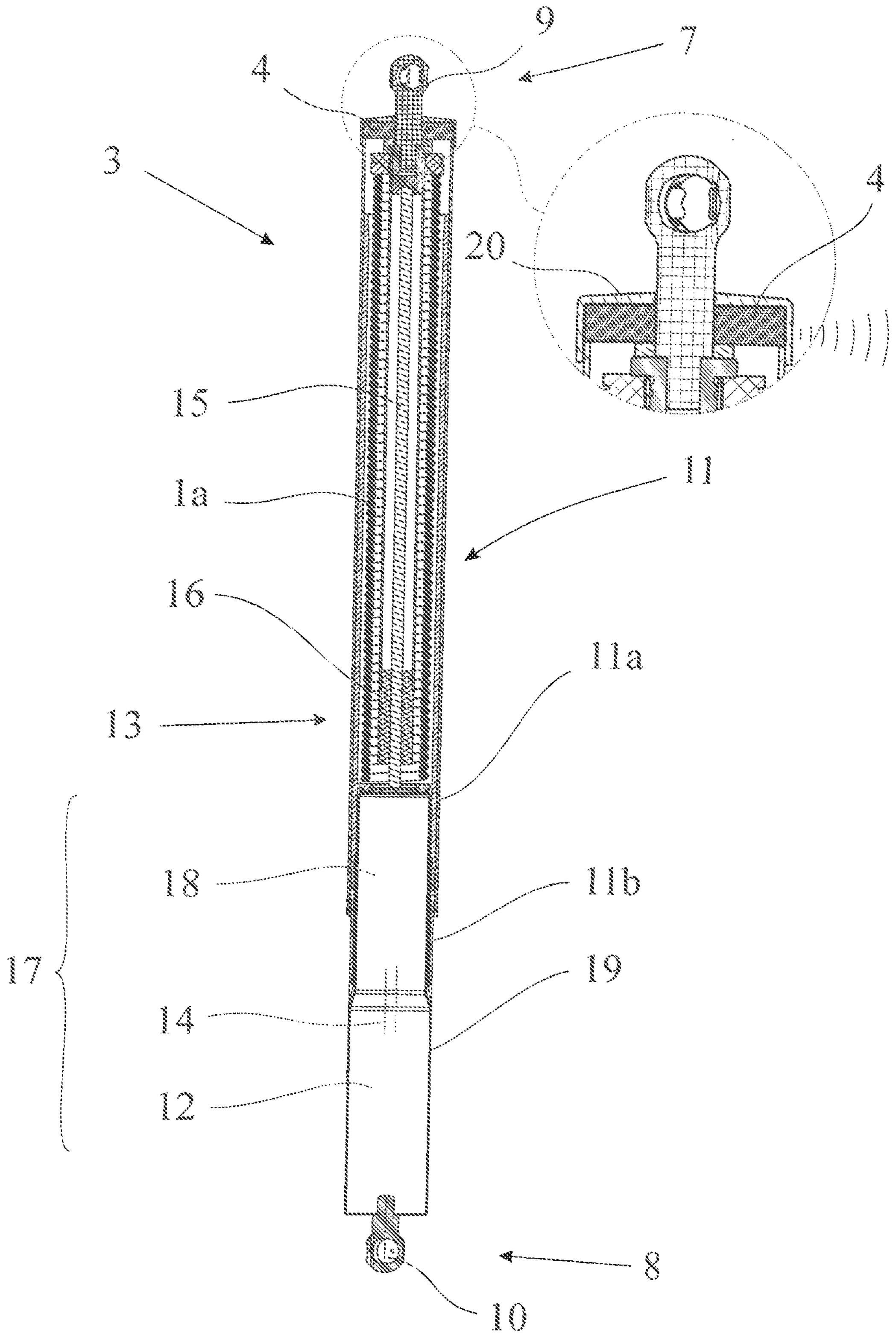
FIG. 3 shows a second embodiment of the drive according to FIG. 2.

In the case of the exemplary embodiment which is illustrated in FIG. 3, the drive housing 11 is equipped with a bush-like termination piece 20 at least at one end, wherein the acoustic indicator 4 is arranged, at least in part, within the bush-like termination piece 20. The bush-like termination piece 20 here is aligned with the geometric axis of the spindle 15 and forms a termination of the one sub-housing 11*a*.

Figure 4:
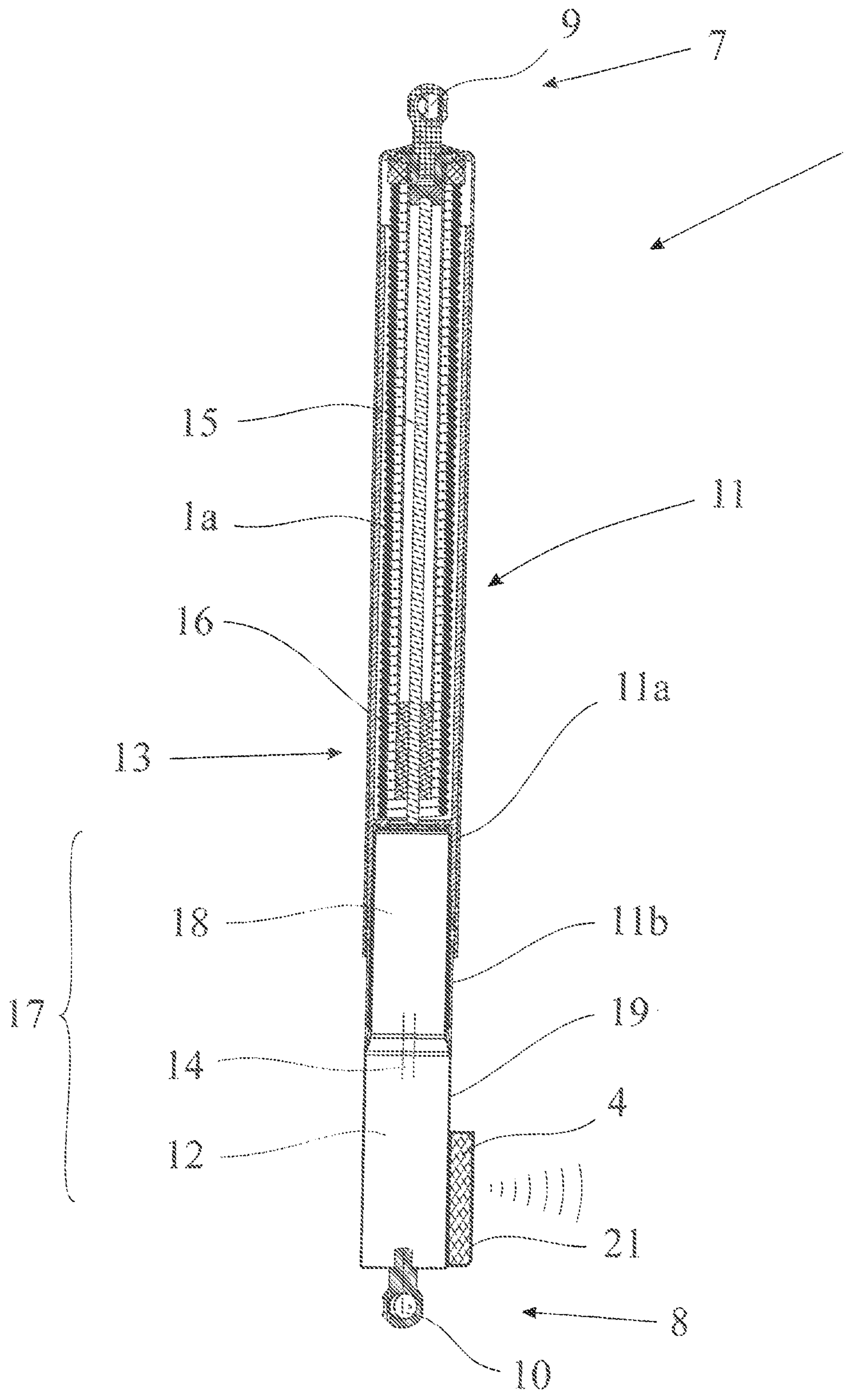
FIG. 4 shows a third embodiment of the drive according to FIG. 2.

In contrast, in the case of the exemplary embodiment which is illustrated in FIG. 4, the acoustic indicator 4 has a dedicated housing 21, which is positioned on the drive 3. This allows a modular construction to be realized in a particularly straightforward manner, and therefore the drive 3 can readily be produced optionally with an acoustic indicator 4 or without an acoustic indicator 4.

In an embodiment, the drive housing 11 or the drive-module housing 19 is configured, and the acoustic indicator 4 is arranged, such that the drive housing 11 or the drive-module housing 19 serves as a resonating body for the acoustic indicator 4. This means that the interior of the drive housing 11 or of the drive-module housing 19 constitutes a resonating space for certain natural frequencies contained in the acoustic feedback.

In respect of a modular construction, the drive 3 may also have an electrical connection arrangement 22 (FIG. 2), wherein the acoustic indicator 4 here, is arranged within the electrical connection arrangement 22. A straightforward variant in respect of the acoustic indicator 4 can be produced, in particular, by the connection arrangement 22 having a cable-like supply line and the acoustic indicator 4 being arranged in or on the cable-like supply line.

It is also conceivable, however, for the electrical connection arrangement 22 to comprise a plug arrangement (not illustrated), wherein the acoustic indicator 4 is arranged in or on the plug arrangement. In specific terms, it may be particularly advantageous if the plug arrangement comprises an intermediate plug, in or on which the acoustic indicator 4 is arranged. This allows different acoustic indicators 4 to be integrated particularly straightforwardly in an existing drive arrangement 1.

The acoustic indicator 4 may be an electrical indicator 4. The acoustic signals of the acoustic indicator 4 are then generated by an electric acoustic generator. The electric acoustic generator can include an electric loudspeaker, an electric buzzer or the like.

It is also conceivable, however, for the acoustic signals of the acoustic indicator 4 to be generated purely mechanically. In specific terms, it is proposed for the acoustic signals of the acoustic indicator 4 to be generated by a relative movement of components of the drive 3 during the motorized adjustment of the drive 3. For example, it is possible to provide, between the two sub-housings 11*a*, 11*b* of the drive housing 11, a kind of ratchet, which emits a ratchet signal when an end position of the spindle drive 3 is reached. It is also conceivable for the compression and decompression of the air located in the telescopic drive housing 11 to be used for generating a whistling sound. Other variants for generating acoustic feedback in a purely mechanical manner are conceivable.

Further teaching, which is important in its own right, claims a closure-element arrangement of a motor vehicle, having a closure element 2 as indicated above and a drive arrangement 1 as indicated above.

The essential factor, according to the further teaching, is that, in the installed state, the drive arrangement 1, in this case the acoustic indicator 4, is exposed at least in part in relation to the motor-vehicle environment at least over an adjusting region of the closure element 2, in this case with the closure element 2 located in the open position (FIG. 1). This ensures that the acoustic feedback generated by the acoustic indicator 4 can pass directly to the user.

It can be gathered from the illustration according to FIG. 1 that the drive 3, for the operation of closing the closure element 2, contracts and penetrates into the drip moulding 23, which is located on the periphery of the tailgate opening 5. With the closure element 2 closed, the entire drive arrangement 1 is covered by the closure element 2 itself while the drive arrangement 1 is located in the drip moulding 23.

Arranging the drive arrangement 1 in the drip moulding 23 can best be realized in an arrangement in which the drive 3 is configured as an elongate spindle drive in the manner indicated above. Such a spindle drive has, as mentioned above, a drive motor 12 and a spindle/spindle-nut gear mechanism 13, which is arranged downstream of the drive motor 12. In the case of such an arrangement, with the closure element 2 closed, the spindle drive 3 is arranged in the drip moulding 23 and correspondingly aligned with the drip moulding 23.

Numerous variants are conceivable for the configuration of the closure element 2. The closure element 2 here, as mentioned above, is a tailgate. It is also conceivable, however, for the closure element 2 to be configured as a boot lid, as a bonnet, as a side door, as a cargo-space hatch closure, as a window, as a pop top or the like of a motor vehicle. All that has been said in respect of the tailgate 2 applies correspondingly to all other kinds of closure element 2.

The invention claimed is:

1. A drive arrangement for a motorized adjustment of a closure element of a motor vehicle, wherein the drive arrangement is configured to couple to the closure element, and in an installed state is configured to provide motorized adjustment of the closure element, wherein the drive arrangement has at least one drive that is configured to generate drive movements to provide the motorized adjustment of the closure element, wherein the drive arrangement has an acoustic indicator arranged in or on the at least one drive, and wherein the acoustic indicator is configured to supply acoustic feedback related to the motorized adjustment of the closure element to a user positioned adjacent to the closure element.

2. The drive arrangement according to claim 1, wherein the acoustic feedback indicates at least one of the motorized adjustment of the closure element, an obstruction of the closure element, the closure element reaching a predetermined position, and an occurrence of a predetermined fault.

3. The drive arrangement according to claim 1, wherein the drive is configured as an elongate linear drive which, at each end, has a mechanical connection for delivering the drive moments.

4. The drive arrangement according to claim 3, wherein the acoustic indicator is arranged in a region of at least one of the mechanical connections.

5. The drive arrangement according to claim 1, wherein the drive has a drive housing, and the acoustic indicator is arranged in or on the drive housing.

6. The drive arrangement according to claim 5, wherein the drive housing has a sleeve termination piece at least at one end, and in that the acoustic indicator is arranged, at least in part, within the sleeve termination piece.

7. The drive arrangement according to claim 5, wherein the drive housing or a drive-module housing is configured for serving as a resonating body for the acoustic indicator.

8. The drive arrangement according to claim 5, wherein drive housing comprises two sub-housings which run telescopically one inside the other during the motorized adjustment.

9. The drive arrangement according to claim 1, wherein the drive is configured as a spindle drive and has a drive motor and a gear mechanism comprising a spindle and a spindle nut, which is directly or indirectly driven by the drive motor.

10. The drive arrangement according to claim 1, wherein the acoustic indicator has a dedicated housing, and the housing of the acoustic indicator is positioned on the drive.

11. The drive arrangement according to claim 1, wherein the drive has an electrical connection arrangement, and the acoustic indicator is arranged within the electrical connection arrangement.

12. The drive arrangement according to claim 11, wherein the electrical connection arrangement comprises a plug arrangement and the acoustic indicator is arranged in or on the plug arrangement.

13. The drive arrangement according to claim 12, wherein the plug arrangement comprises an intermediate plug, in or on which the acoustic indicator is arranged.

14. The drive arrangement according to claim 11, wherein the electrical connection arrangement has a supply line, and wherein the acoustic indicator is arranged in or on the supply line.

15. The drive arrangement according to claim 1, wherein acoustic signals of the acoustic indicator are generated by an electric acoustic generator.

16. The drive arrangement according to claim 15, wherein the acoustic indicator comprises an electric loudspeaker or an electric buzzer.

17. The drive arrangement according to claim 1, wherein acoustic signals of the acoustic indicator are generated by a relative movement of components of the drive during the motorized adjustment of the drive.

18. A closure-element arrangement of a motor vehicle comprising a closure element and the drive arrangement according to claim 1, wherein, in the installed state, the drive arrangement is exposed at least in part in relation to a motor-vehicle environment at least over an adjusting region of the closure element.

19. The closure-element arrangement according to claim 18, wherein, with the closure element closed, the drive arrangement is covered by the closure element.

20. The closure-element arrangement according to claim 18, wherein the closure element is selected from the group consisting of a tailgate, a boot lid, a bonnet, a side door, a cargo-space hatch closure, a window, and a pop top of the motor vehicle.

* * * * *